(12) United States Patent
Nakayama et al.

(10) Patent No.: US 6,385,227 B1
(45) Date of Patent: May 7, 2002

(54) SOLID-STATE LASER APPARATUS AND LASER PROCESS APPARATUS

(75) Inventors: Michio Nakayama; Teruichiro Fukasawa, both of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/480,462

(22) Filed: Jan. 11, 2000

(30) Foreign Application Priority Data

Jan. 12, 1999 (JP) .......................................... 11-005113

(51) Int. Cl.$^7$ ................................................ H01S 3/08
(52) U.S. Cl. ........................... 372/92; 372/34; 372/70; 372/72
(58) Field of Search ............................ 372/69, 72, 34, 372/75; 375/92

(56) References Cited

U.S. PATENT DOCUMENTS

| | | | | |
|---|---|---|---|---|
| 4,150,341 A | * | 4/1979 | Ferguson | 372/35 |
| 4,601,038 A | * | 7/1986 | Guch, Jr. | 372/34 |
| 4,894,837 A | * | 1/1990 | DiFonzo et al. | 372/72 |
| 4,984,246 A | * | 1/1991 | Cabaret et al. | 372/69 |
| 4,993,038 A | * | 2/1991 | Nakano et al. | 372/92 |
| 5,299,213 A | * | 3/1994 | Kuba et al. | 372/24 |
| 5,311,528 A | * | 5/1994 | Fujino | 372/34 |
| 6,038,244 A | * | 3/2000 | Usui et al. | 372/75 |

FOREIGN PATENT DOCUMENTS

| | | |
|---|---|---|
| JP | 5-335662 | 12/1993 |
| JP | 5-335663 | 12/1993 |
| JP | 6-252473 | 9/1994 |
| JP | 8-70150 | 3/1996 |
| JP | 8-250789 | 9/1996 |

\* cited by examiner

Primary Examiner—Leon Scott, Jr.
(74) Attorney, Agent, or Firm—Oblon, Spivak, McClelland, Maier & Neustadt, P.C.

(57) ABSTRACT

A solid-state laser apparatus of the laser diode excitation type includes a condenser mirror to input incident light to a solid laser rod. The condenser mirror has an elliptical shape. In this apparatus, one focus of the mirror is located in a laser beam incident side and the other focus is located in a central axis of a laser rod. In addition, beam axes of beams from laser diodes are fixed to a long axis of the oval condenser mirror.

15 Claims, 11 Drawing Sheets

SOLID-STATE LASER APPARATUS AND LASER PROCESS APPARATUS

BACKGROUND OF THE INVENTION

1. Field of the Invention

This invention relates to a laser diode excitation type solid-stat laser apparatus having laser diodes.

2. Discussion of the Background

The related art includes a solid-state laser apparatus in which a laser rod is excited by incident light from a plurality of laser diodes. Japanese Non-examined Patent Publications No.5-335662 and No.6-252473 disclose a laser diode excitation type solid-state laser apparatus having a solid-state laser medium which is excited by incident light from a plurality of laser diodes for matching the incident light with a Gaussian beam profile.

The solid-state laser apparatus, however, is difficult to maintain because of the difficulty in replacing defective or failed laser diodes. In addition, the laser apparatus has low reliability and is large.

Japanese Non-examined Patent Publication No.5-335663 also discloses the laser diode excitation type solid-state laser apparatus. The laser apparatus disclosed in this publication has a laser rod in which most of the laser diode beams are applied to only one side of the laser rod. Thus, the laser rod has unbalanced thermal distribution Japanese Non-examined Patent Publications No. 8-70150 and No. 8-250789 each disclose a flash lamp excitation type solid-state laser apparatus. The laser apparatus disclosed in these publications, has a solid-state laser rod which is excited by incident light on the laser rod after reflection on a surface of an oval mirror that includes both the laser rod and the flash lamp.

However, the laser apparatus is difficult to maintain, because the laser rod and the flash lamp cannot be replaced without taking the oval mirror apart. Consequently, the laser apparatus has low reliability. In addition, the laser apparatus is large because the oval mirror includes the laser rod and the flash lamp. Moreover, the flash lamp has a shorter life span than the laser diodes so that the laser apparatus disclosed in these publications has a short life span.

SUMMARY OF THE INVENTION

An object of the present invention is to provide a solid-state laser apparatus that is easy to maintain, achieves high reliability, and is small in size. Another object of the present invention is to provide a laser apparatus that has a solid-state laser rod with balanced thermal distribution applied to the circumference of the laser rod by the incident light from the laser diodes.

The present invention provides a solid-state laser apparatus that comprises a condenser mirror, at least one laser diode, and a laser rod. The condenser mirror has a curved cross-sectional shape with first and second foci. The at least one laser diode is arranged at the first focus of the condenser mirror for irradiating light to the laser rod. A central axis of the laser rod is arranged at the second focus of the condenser mirror. Light axes of the light coincide with the direction of the long axis of the condenser mirror.

BRIEF DESCRIPTION OF THE DRAWINGS

A preferred form of the present invention is illustrated in the accompanying drawings in which:

FIG. 3 (*b*) is a diagram of the light from the laser diodes of the apparatus of FIG. 1;

DESCRIPTION OF THE PREFERRED EMBODIMENTS

Figure 1:
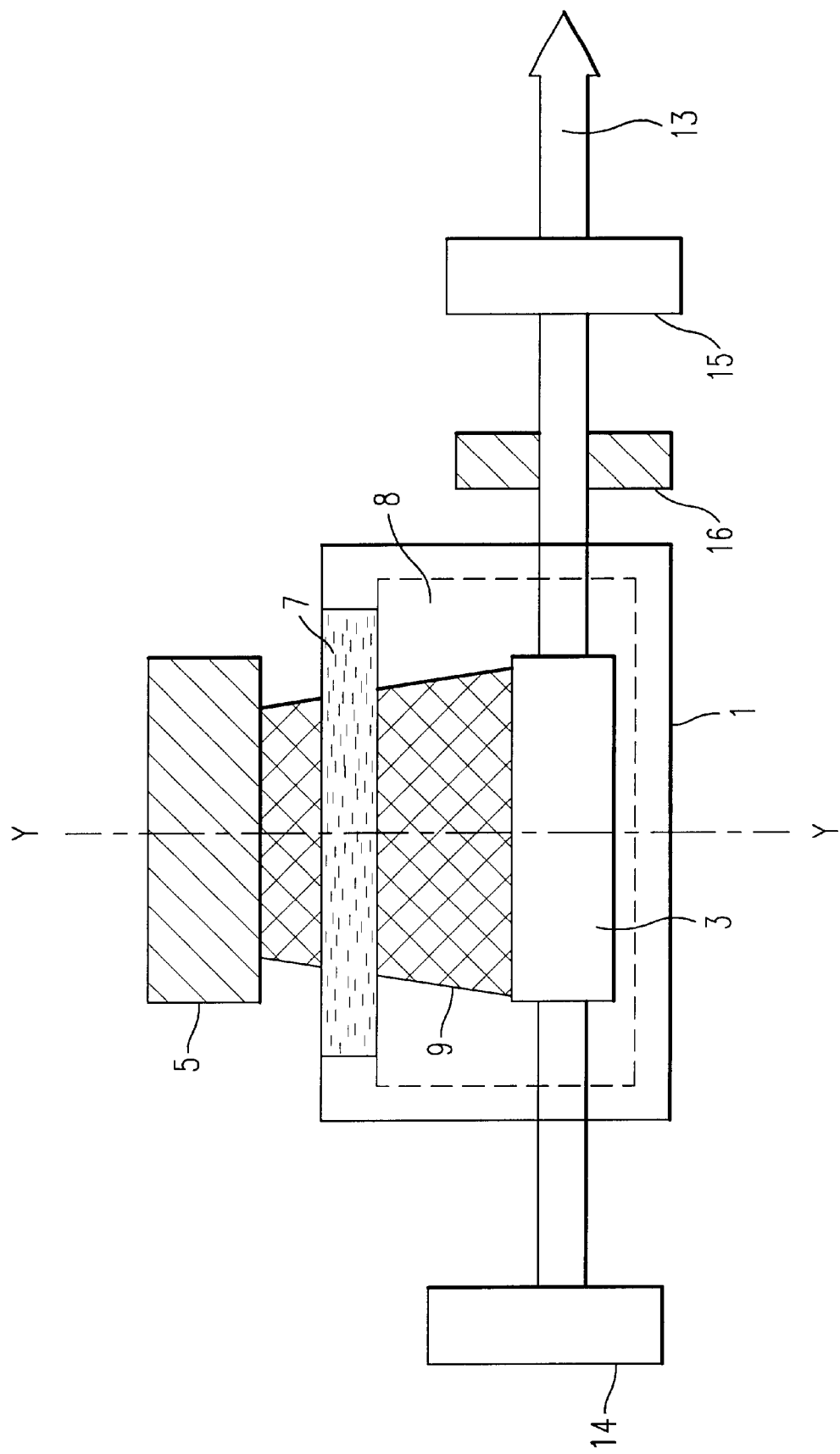
FIG. 1 is a block diagram of a solid-state laser apparatus according to a first embodiment of the present invention.
Figure 2:
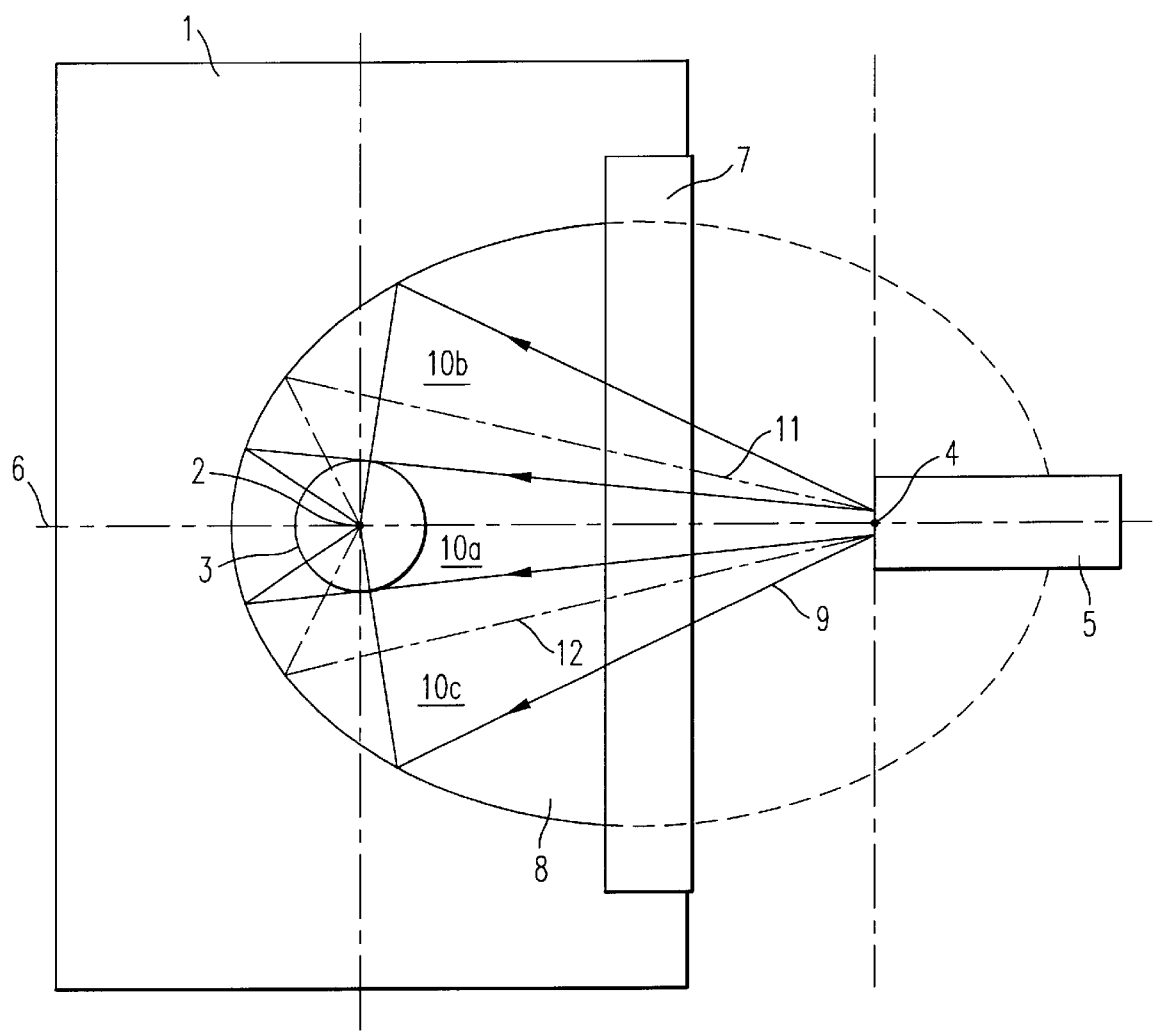
FIG. 2 is a cross-sectional view taken on line Y–Y' of FIG. 1.

Referring to FIGS. 1 and 2, a solid-laser apparatus is shown according to a first embodiment of the present invention. FIG. 1 is a block diagram of a solid-state laser apparatus according to a first embodiment of the present invention, and FIG. 2 is a cross-sectional view taken on line Y–Y' of FIG. 1.

In this embodiment, a condenser mirror 1 is used as a condenser apparatus. In one embodiment, the condenser mirror 1 is made of copper or ceramic (for example, a glasslike matrix with fluorine-metal mica precipitating). The condenser mirror 1 has a reflecting surface with a transverse cross-sectional curved shape. In one embodiment, the curved shape is a portion of an ellipse. In another embodiment, the curved shape is a portion of an oval. In one embodiment, the reflecting surface of the condenser mirror 1 is coated with gold. The reflecting surface of the condenser mirror 1 preferably has a light reflecting rate greater than 90% at the band of the wavelength in which the laser diodes 5 oscillate.

A laser rod 3 has a central axis arranged at a focus 2 of the condenser mirror 1. The laser rod 3 may be, for example, formed of a YAG crystal. In addition, a light output portion of at least one laser diode 5 is arranged at another focus 4 of the condenser mirror 1. For example, a one-dimension type laser diode array arranged along the laser rod 5 is suitable for the first embodiment. The optical axis of the laser diodes 5 coincides with a line between the focus 2 and the focus 4. Thus, the optical axis coincides with the long axis of the condenser mirror 1.

A partition 7, made of silicon glass, for example, is arranged between the, laser rod 3 and the laser diodes 5. The partition 7 seals liquid on the side of the open portion of the condenser mirror 1. An area 8 between the partition 7 and the inside of the oval condenser mirror 1 has a passage for flow of a cooling medium to cool the laser rod 3. The cooling medium may be, for example, water or alcohol.

Light 9 from tho laser diodes 5 with a prescribed diffusion angle is incident on the laser rod 3 through the partition 7. In the light 9, the length between the focus 2 and the focus 4 (i.e. the length between the central axis of the laser rod 3 and the output portions of the laser diodes 5) is arranged to a value in which the power of a component 10a, a component 10b, and a component 10c are equal. The component 10a is directly incident on the laser rod 3. By contrast, the component 10b and the component 10c are incident on the laser rod 3 after reflection by the condenser mirror 1.

The eccentricity of the condenser mirror 1 is selected so that a light axis 6 and a light axis 11 and a light axis 12 are at an angle of 120 degrees from each other. The light axis 11 is given as the center of gravity about the light intensity of the component 10a. Similarly, the light axis 12 is given as the center of gravity about the light intensity of the component 10b. Thus, the light 9 reflected by the condenser mirror 1 is incident on the laser rod 3 at the same light intensity from the angle of 120 degrees.

The laser rod 3 is thus excited at substantially the same thermal distribution. A laser light 13 is generated by an oscillator formed of a totally reflective mirror 14 and a partially reflective mirror 15. A mode selector 16 is inserted into the oscillator to generate the $TEM_{00}$ mode (side mode) light.

Figure 3A:
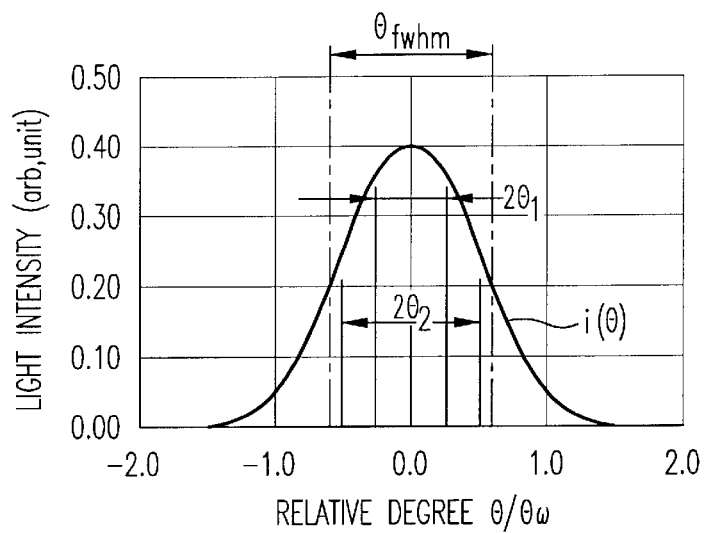
FIG. 3 (*a*) is a graph showing light intensity relationship for a relative degree of a cross-sectional area of light from laser diodes of the apparatus of FIG. 1.
Figure 3B:
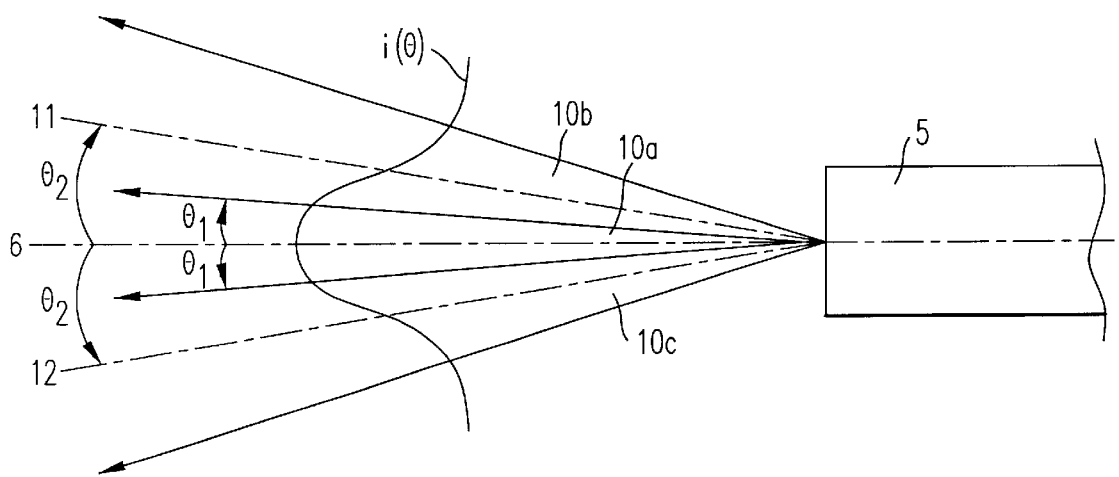

Referring to FIGS. 3(a) and 3(b), these two drawings indicate the shape of the condenser mirror 1 according to the first embodiment of the present invention. FIG. 3(a) is a graph showing a light intensity (measured by an arbitrary unit) relationship for a relative degree for a cross-sectional area of light from the laser diodes 5, and FIG. 3(b) is a diagram of the light from the laser diodes 5.

An angle $\theta_{fwhm}$ is the full width about the diffusion angle of the half value of the intensity of the light 9 shown in FIG. 3(a) and FIG. 3(b). In one embodiment, the light 9 has a Gaussian beam profile.

Under this situation, the distribution relationship for the intensity $I(\theta)$ of the light 9 is given approximately by the equations defied below as follows:

$$i(\theta)=\exp[-2\times(\theta/\theta_w)^2] \tag{1},$$

where the angle $\theta_w$ defined by equation (2) as follows:

$$\theta_w=\theta_{fwhm}/1.18 \tag{2}.$$

A function is defined as follows:

$$I(\xi\to\infty)=\int i(\theta)d\theta:\{\text{the integral section }(-\infty,\xi)\} \tag{3}$$

Moreover, $I(\xi\to\infty)=1$.

Thus, all of the power of the light 9 is normalized to '1' when the coefficients in the right side of the equation (1) are selected. Under this situation, in order to calculate the diffusion angle at the ⅓ power of the light 9, the angle $\theta_1$ is determined based on the equation (4) a follows:

$$1-I(\theta_1)=\frac{1}{3} \tag{4}.$$

The angle $\theta_1$ is calculated and has a value defined by equation (5) as follows:

$$\theta_1=0.216\times\theta_w=0.255\times\theta_{fwhm} \tag{5}.$$

Moreover, the diffusion angle $\theta_2$ of the center of gravity about the light intensity located outside of the angle is determined by the equation 6 as follows:

$$1-I(\theta_2)=\frac{1}{6} \tag{6}.$$

Therefore, a function is given by equation (7) as follows:

$$\theta_2=0.482\times\theta_w=0.569\times\theta_{fwhm} \tag{7}.$$

If the condenser mirror 1 corresponds to the result disclosed above, the angle $\theta_1$ is the half of the diffusion degree of the light 9 directly incident on the laser rod 3. Under this situation, the angle $\theta_2$ corresponds to the angle between one of the light axes of the incident lights to the laser rod 3 through the condenser mirror 1 and the other light axes.

In the embodiment illustrated by equations (4) through (7), the power incident on the laser rod 3 is approximately equal. Preferably, the power directly incident from the laser diodes 5 on the laser rod 3 is 30–40% of the total power incident on the laser rod 3. Although the illustrative embodiment also describes the three components 10a, 10b, and 10c, the present invention is not so limited and two or more components may be used in designing the condenser mirror.

A method to calculate the length between the two foci of the condenser mirror 1 is described. Here, the influence caused by the refraction effect through the partition 7 is disregarded to simplify the calculations.

The distance between the laser rod 3 and the open portion in which the laser diodes 5 irradiate the light 9 (i.e. the distance between two foci of the condenser mirror 1) is defined as '2k'. The radius of the laser rod 3 is defined as 'r'. Then, the angle $\theta_1$ is expressed by equation (8) as follows:

$$\theta_1=\sin^{-1}(r/2k) \tag{8}.$$

Equation (9) is determined from the equations (5) and (8) as follows:

$$k=r/|2\times\sin(0.255\times\theta_{fwhm})| \tag{9}.$$

Given the illustrative embodiment of $\theta_{fwhm}=30°$ and r=15 mm, the results a calculated as follows: $\theta_1=76.5°$, k=5.63, and $\theta_2=17.01°$.

Figure 4:
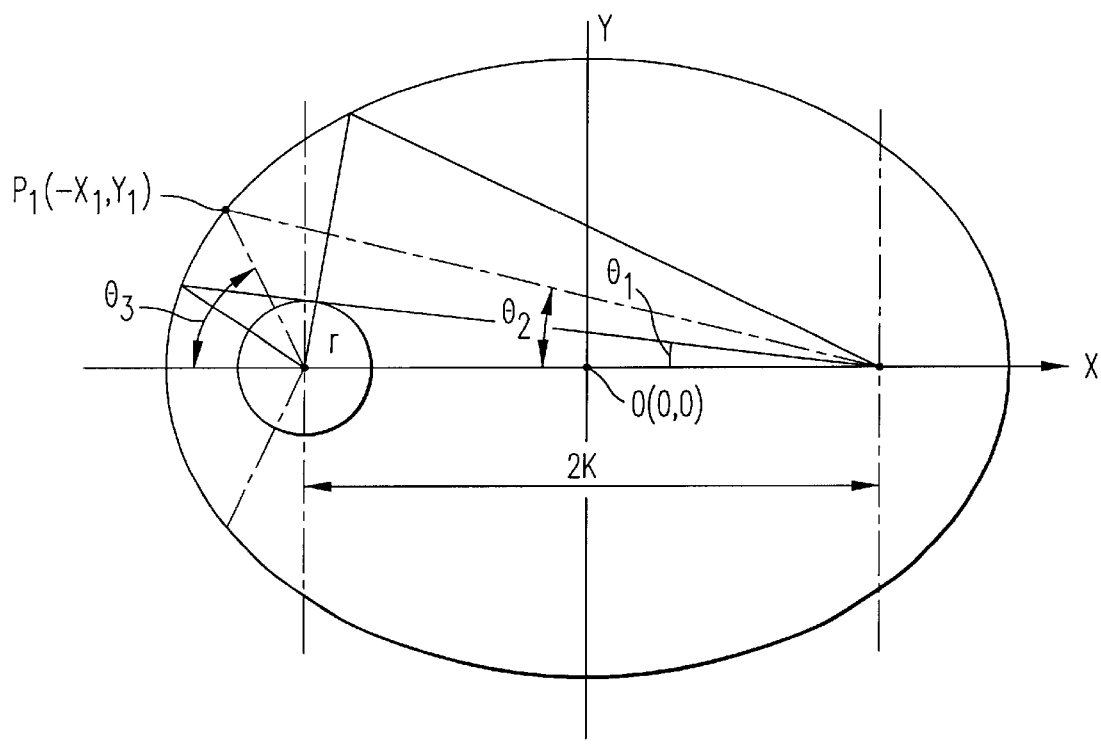
FIG. 4 is a schematic diagram for calculating an eccentricity of a condenser mirror, FIG. 5 (*a*) is a cross-sectional view showing a first modification of the first embodiment of the present invention.

FIG. 4 is a schematic diagram for calculating an eccentricity of the condenser mirror 1. The method to calculate the eccentricity 'e' of the condenser mirror 1 is described below. The light axis at an angle $\theta_2$ from the long axis of the condenser mirror 1 and the other light axis of the light reflected by the condenser mirror 1 makes an angle $\theta_3$ between the long axis of the condenser mirror 1.

If the coordinates of a cross point $P_1$ made by this light axis and the inside reflecting surface are $(-x_1, y_1)$, the coordinates $(x_1, y_1)$ are described below by equations (10) and (11) as follows:

$$x_1=k\times(\tan\theta_2+\tan\theta_3)/(\tan\theta_3-\tan\theta_2) \tag{10}$$

$$y_1=(x_1-k)\times\tan\theta_2 \tag{11}.$$

In this illustrative embodiment, the angle $\theta_3=60°$. In addition, the angle $\theta_2$ and the distance k are described by equations (7) and (8).

Thus, $x_1$ and $y_1$ are calculated on these conditions. Under the conditions described above, the coordinate $x_1$ is 8.05 mm, and the coordinate $y_1$ is 4.19 mm. The equation (12) is determined because the ellipse function is formed at the point of $(-x_1, y_1)$.

$$x^2+y^2/(1-e^2)=k^2/e^2 \tag{12}.$$

The eccentricity 'e' of the condenser mirror 1 is calculated from the equation (12). Thus, under the condition of $0\leq e\leq 1$, it is possible to calculate the eccentricity 'e'. In this illustrative embodiment, the result of e=0.588 is calculated under the conditions shown above.

Figure 5A:
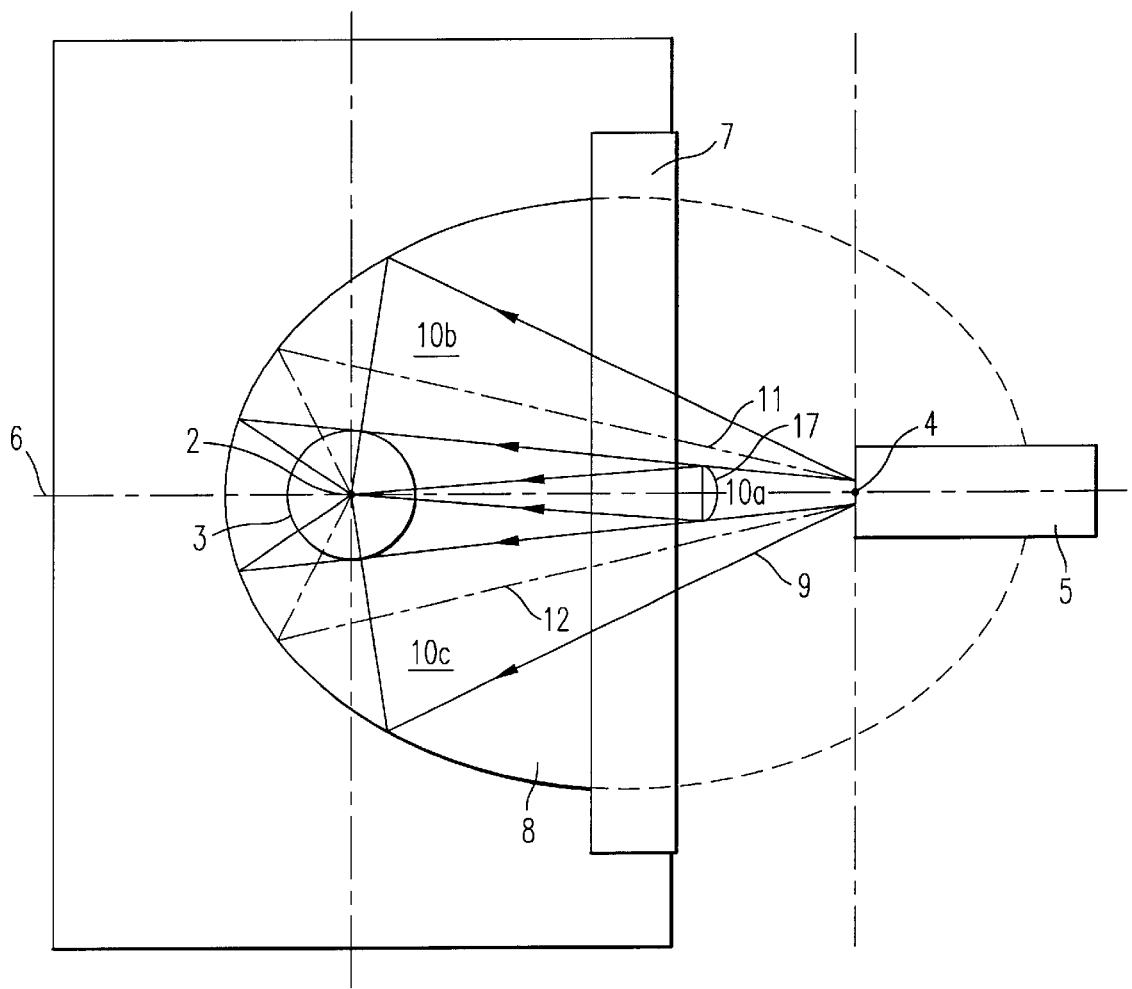
FIG. 5 (*b*) is a cross-sectional view showing a second modification of the first embodiment of the present invention.

FIG. 5(a) is a cross-sectional view showing a first modification of the first embodiment of the present invention. In this modification, a cylindrical lens 17 is mounted on the side of the partition nearest the laser diodes 5. The cylindrical lens 17 influences only the component 10a which is directly incident on the laser rod 3. In addition, the cylindrical lens 17 is mounted between the laser diodes 5 and the partition 7. The light 9 is concentrated on the laser rod 3 through the cylindrical lens 17. Thus, the cylindrical lens 17 concentrates the light 9 the component 10a similar to the component 10b and the component 10c reflected by the condenser mirror 1.

Figure 5B:
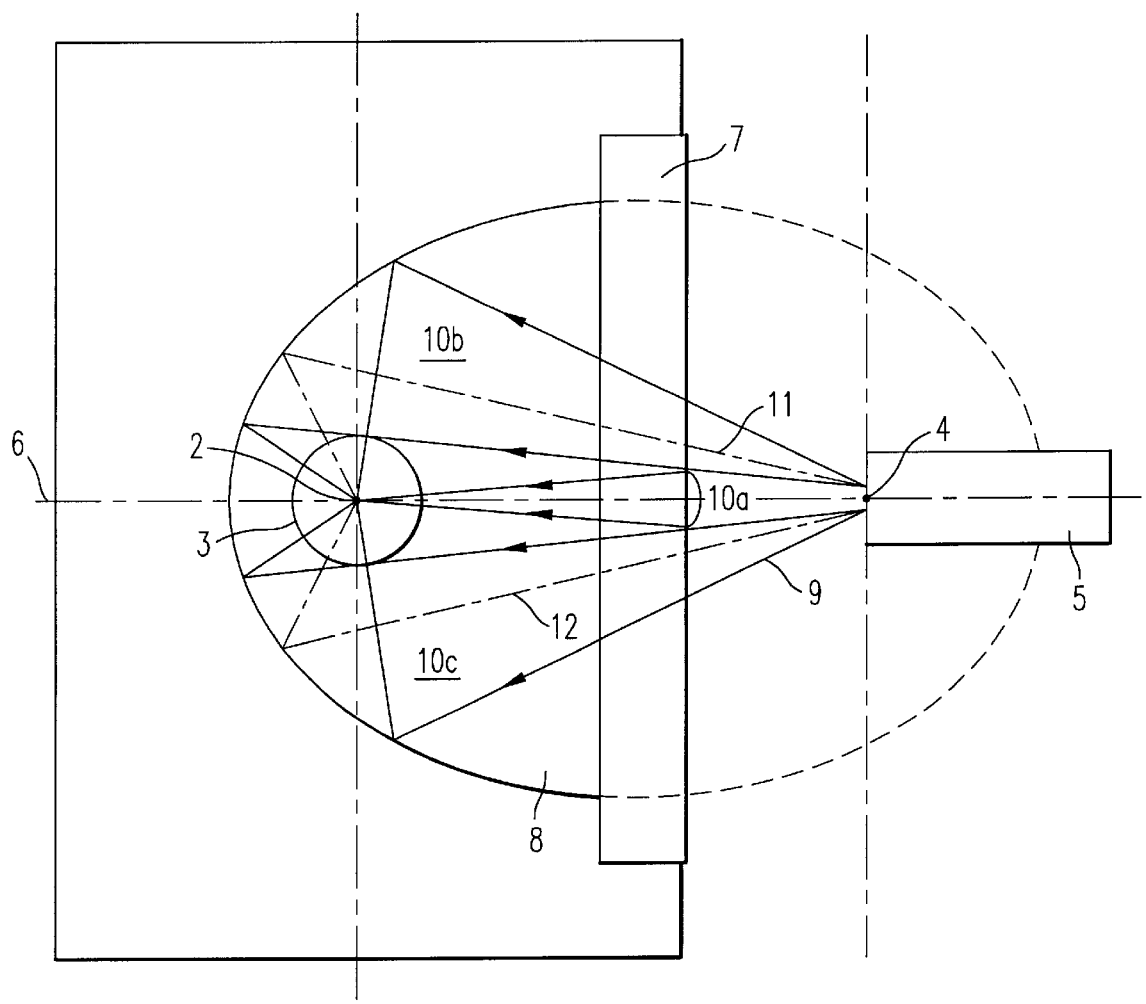

FIG. 5(b) is a cross-sectional view showing a second modification of the first embodiment of the present invention. In this modification, a cylindrical lens 17 is monolithic with the partition 7 at a selected area. In addition, the same parts in FIG. 5(a) and FIG. 5(b) are numbered by the same reference numerals.

In these constructions shown as the first embodiment, the profile of the light 9 in the laser rod 3 is more suitable for the oscillation with a $TEM_{00}$ mode.

Figure 6:
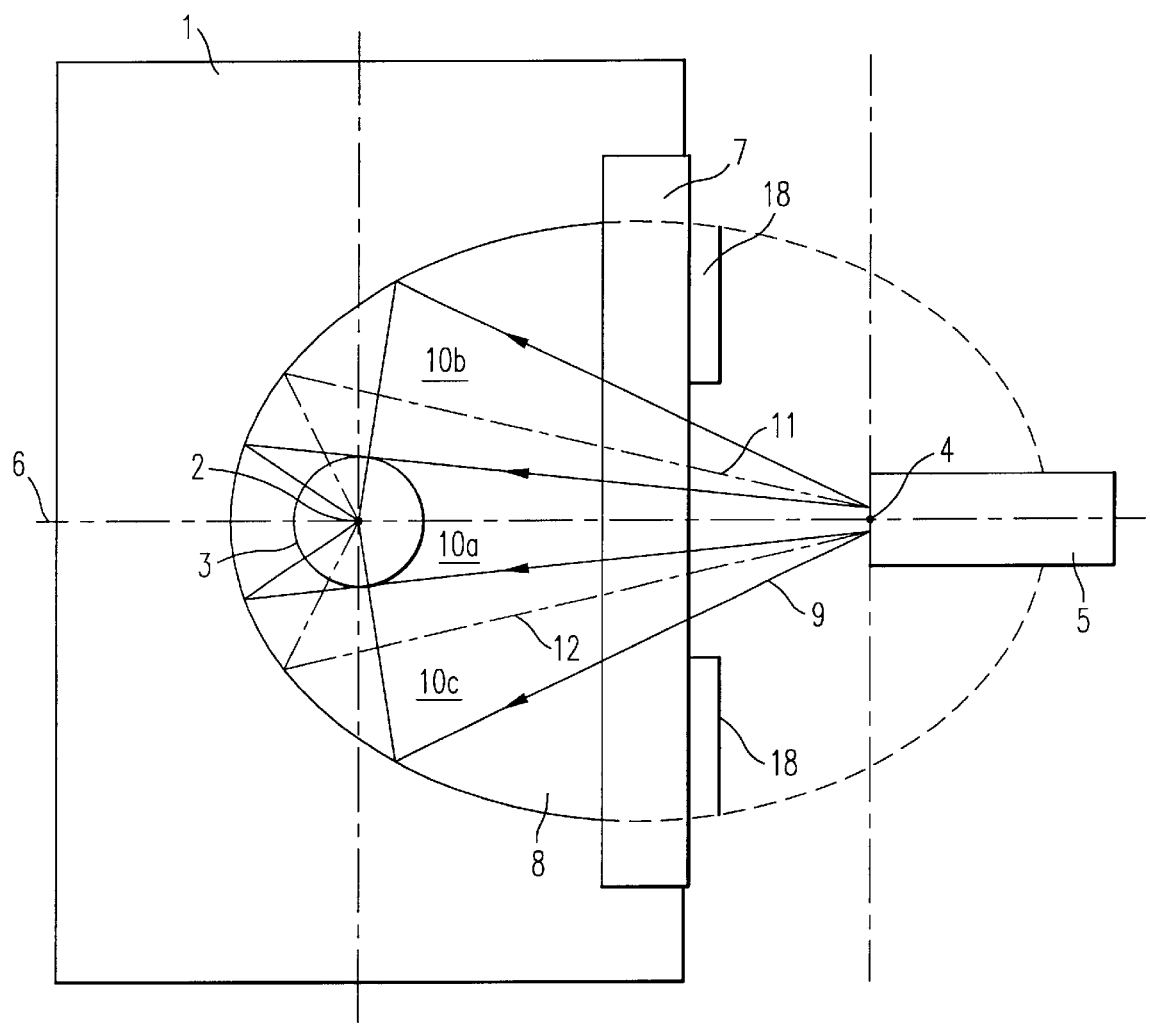
FIG. 6 is a cross-sectional view showing a third modification of the first embodiment of the present invention.

Referring to FIG. 6, there is shown a cross-sectional view showing a third modification of the first embodiment of the present invention. In this modification, a reflecting member 18 for the laser rod 3 is arranged on the partition 7 on the side of the laser diodes 5 except in a path of the light 9. The reflecting member 18 has a reflective surface on the side of the reflecting member 18 adjacent the partition 7 to reflect light toward the laser rod 3 and the condenser mirror 1. This modification provides a higher efficiency on light concentrating to the laser rod 3.

Figure 7:
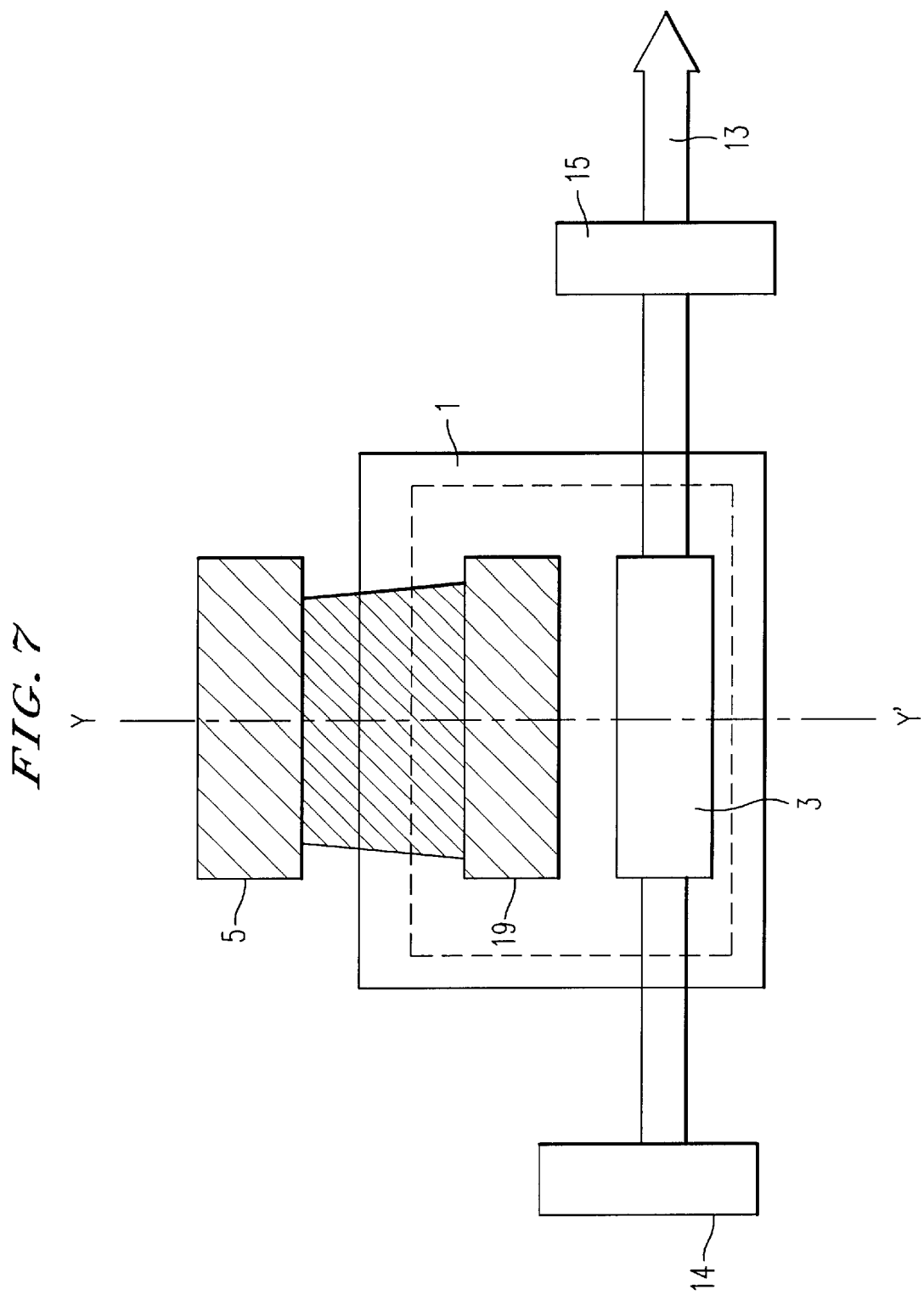
FIG. 7 is a block diagram of a solid-state laser apparatus according to a second embodiment of the present invention.
Figure 8:
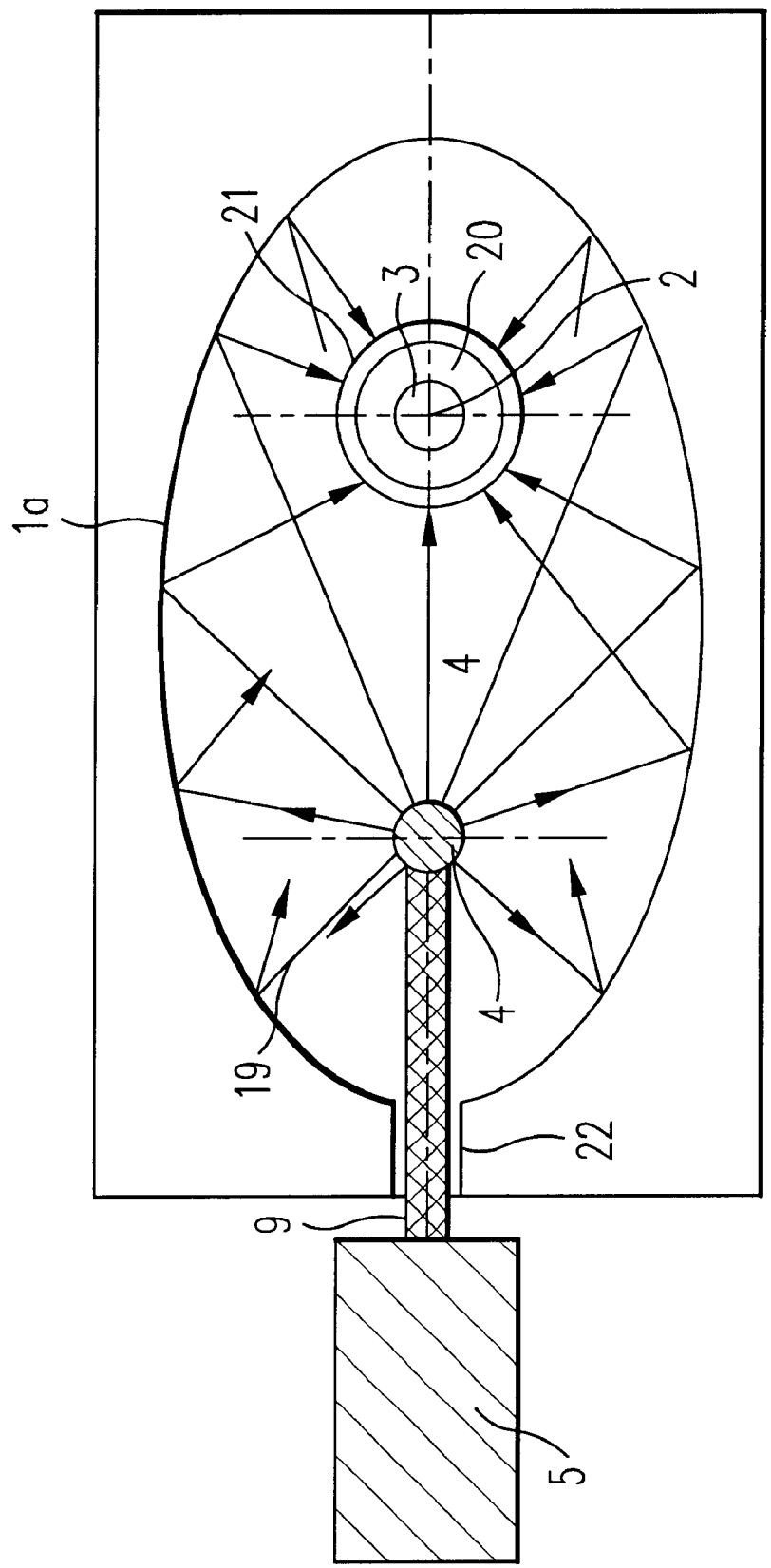
FIG. 8 is a cross-sectional view taken on line Y–Y' of FIG. 7.

Referring to FIGS. 7 and 8, there is shown a solid-state laser apparatus according to a second embodiment of the present invention. FIG. 7 is a block diagram of a solid-state laser apparatus according to a second embodiment of the present invention, and FIG. 8 is a cross-sectional view taken on line Y–Y' of FIG. 7.

Also in this embodiment, a condenser mirror 1a is used as a condenser apparatus. In one embodiment, the condenser mirror 1a is made of copper or ceramic (for example, a glasslike matrix with fluorine-metal mica precipitating). The condenser mirror 1a has a reflecting surface with a transverse cross-sectional curved shape. In one embodiment, the curved shape is substantially an ellipse. In another embodiment, the curved shape is substantially an oval. In one embodiment, the reflecting surface of the condenser mirror 1a is coated with gold. The reflecting surface of the condenser mirror 1a preferably has a light reflecting rate greater than 90% in the band of the wavelength in which the laser diodes 5 oscillate.

The laser rod 3 and an optical diffuser 19 are arranged in the condensor mirror 1a. In addition, the laser rod 3 is arranged in the flow path of the cooling medium to cool the laser rod 3. The central axis of the laser rod 3 is arranged at a focus 2 of the condenser mirror 1a. The optical diffuser 19 is arranged at another focus 4 of the condenser mirror 1a. The optical diffuser 19 is shaped similar to the laser rod 3 and is arranged parallel to the laser rod 3. The diameter of the optical diffuser 19 preferably is less than the diameter of the laser rod 3. The optical diffuser 19 is preferably made of a ceramic and has a light reflecting rate greater than 90% in the band of the wavelength in which the laser diodes 5 oscillate.

The collimated light 9 is incident on the optical diffuser 19 through a slit 22 in a side portion of the condenser mirror 1a.

For example, a one-dimension type laser diode array arranged along the laser rod 3 is suitable for the second embodiment. In one embodiment, a cylindrical lens may be arranged near the laser diodes 5 to collimate the light 9.

The light 9 changes its propagation direction after being incident on and reflected by the optical diffuser 19. At that time, the light 9 is diffused by the optical diffuser 19. The other part of the light 9 is incident on the inside of the optical diffuser 19 and is irradiated to the outside after diffusion within the optical diffuser 19.

Thus, the light 9 from the optical diffuser 19 does not have any substantial direct progress. Therefore, the optical diffuser 19 behaves as a light source, and optically, this is equivalent to an action of a lump excited laser.

In the condenser mirror 1a, the optical diffuser 19 is arranged on the axis located at the focus 4. Therefore, an image of the optical diffuser 19 appears on the axis located at the focus 2. Thus, the light 9 diffused by the optical diffuser 19 is reflected on the surface of the condenser mirror 1a and is incident on the laser rod 3. As the result, the laser rod 3 is excited uniformly.

Figure 9:
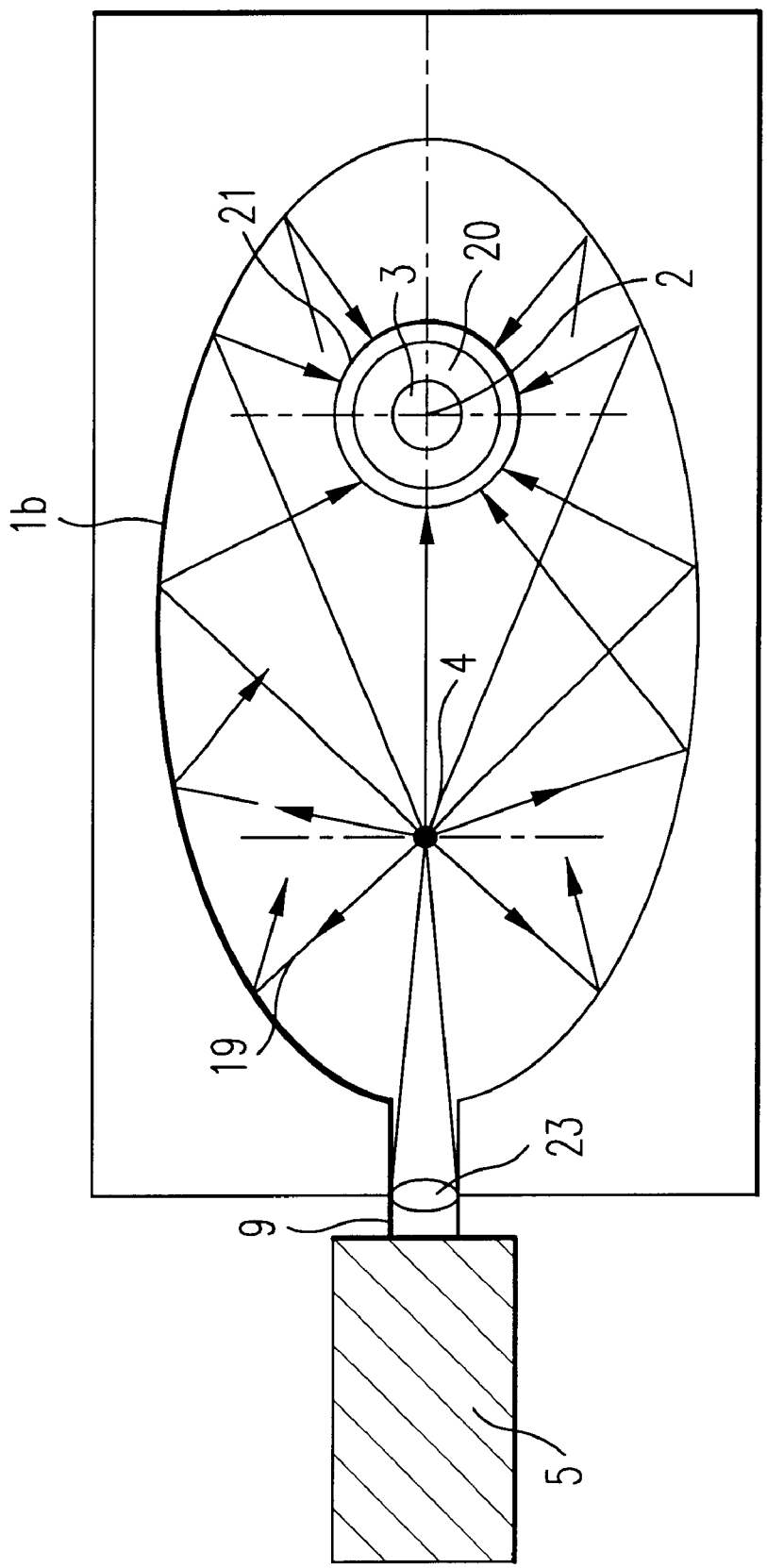
FIG. 9 is a cross-sectional view showing a modification of the second embodiment of the present invention.

FIG. 9 is a cross-sectional view showing a modification of the solid-state laser apparatus according to the second embodiment of the present invention. In the second embodiment, though the light 9 from the laser diodes 5 is incident on the optical diffuser 19 though the slit 22, the slit 22 is not necessary for a transformation of this embodiment disclosed in FIG. 9. That is, through the lens 23, the light 9 from the laser diodes 5 is incident on the optical diffuser 19 located on the focus 4, and the light 9 from the optical diffuser 22 irradiates the laser rod 3 after the reflection on the surface of a condenser mirror 1b.

In one embodiment, the laser rod 3 is cooled by cooling water 20 in a flow path 21. In another embodiment, the cooling water flows in the condenser mirror 1b. In this case, a transparent member or a packing member is preferably arranged in the light path in the inside of the condenser mirror 1b.

In addition, it is not necessary for the solid-state laser apparatus of the present invention to exchange optical parts contained by the oval condenser mirror 1, 1a, and 1b. And, it is very easy for users to maintain the solid-state laser apparatus because the optical parts are able to be exchanged easily. This characteristic is different from a solid-state laser apparatus excited by a flash lamp.

Figure 10:
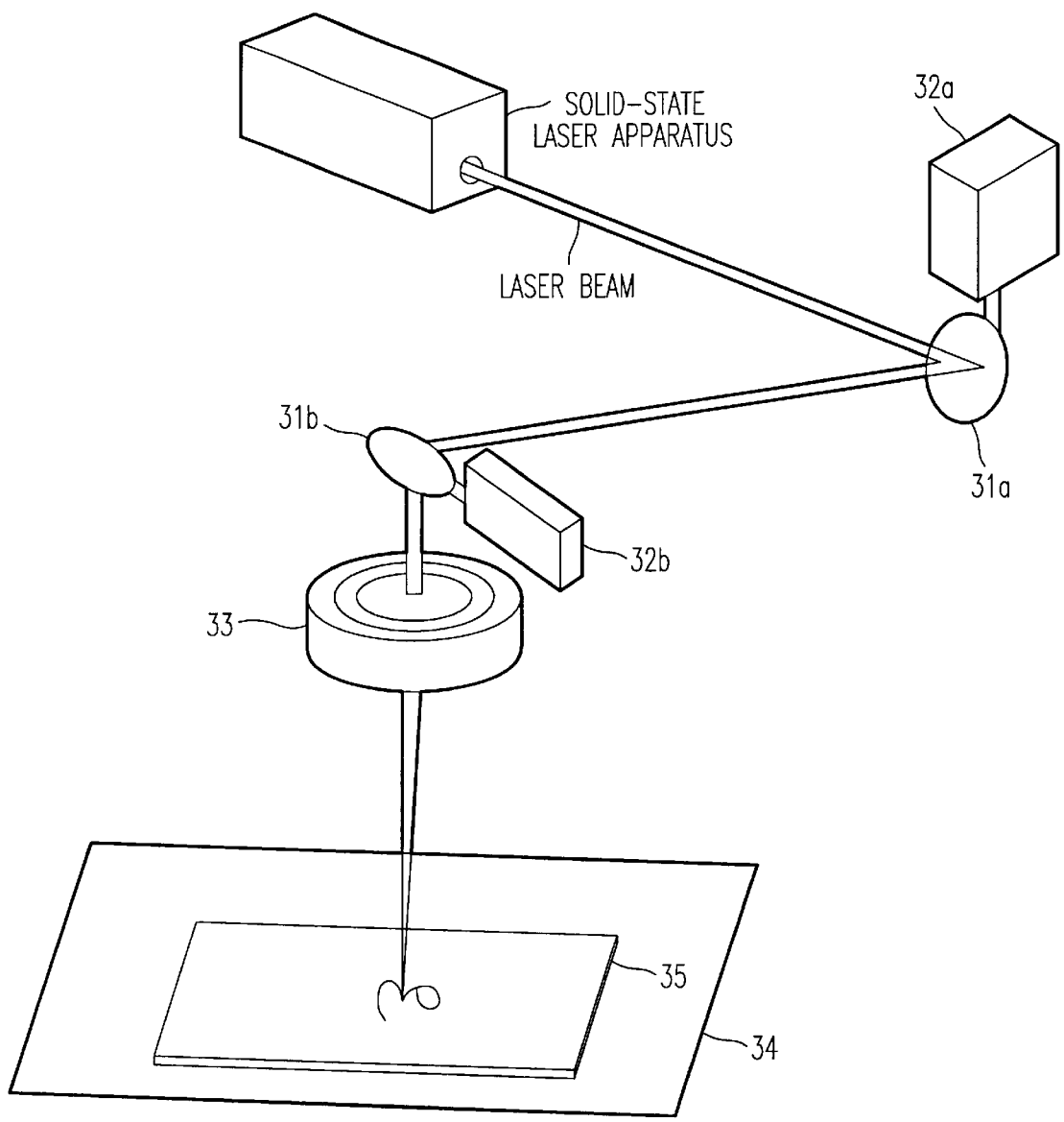
FIG. 10 is a perspective view showing a laser marking apparatus according to a third embodiment of the present invention.

Referring to FIG. 10, there is shown a laser process apparatus according to a third embodiment of the present invention. FIG. 10 is a perspective view of a laser marking apparatus, representative of the laser process apparatus according to the present invention. The laser marking apparatus may use one stroke of a laser scan. Thus, the light from the solid-state laser apparatus is reflected on the surfaces of a mirror 31a and a mirror 31b. Each of the mirrors 31a and 31b is rotated by respective actuators 32a and 32b. The light reflected on the mirror 31a, 31b is incident through a lens 33 on an object for processing, such as an IC package, located on a table 34. Then, the laser marking apparatus marks the surface of the object with one stroke of the laser scan. But the method of the marking in this embodiment is not limited to one stroke of the laser scan; this embodiment may process the object through a mask or with an action of a raster scanning.

In this case, a process by the first embodiment is a deep carved process in the central portion. Thus, the process by the first embodiment is suitable for a deep process such as for a thick object, a bright curved process, and a detail curved process. These processes are suitable for a thick object because the maximum intensity peak of the the light from the solid-state laser apparatus of the first embodiment is located in the center of the light.

In addition, if the diameter of the optical diffuser 19 is more than that of the laser rod 3, a process by the second embodiment is suitable for a flat carved process such as for a thin object. This process is suitable for a thin object because the light for processing from the laser rod 3 has a flat intensity profile. Thus, a semiconductor device will not be damaged if the IC package is processed by the light from the second embodiment.

On the contrary, if the diameter of the optical diffuser 19 is not more than that of the laser rod 3, a process by the second embodiment is suitable for a deep process, such as for a thick object. This phenomenon is the same as a process using the first embodiment because the maximum intensity peak of the light from the solid-state laser apparatus of the first embodiment is located in the center of the light.

The present invention may be embodied in other specific forms without departing from the spirit or essential characteristics thereof. The present embodiment is therefore to be considered in all respects as illustrative and not restrictive, the scope of the present invention being indicated by appended claims rather than by the foregoing description and all changes which come within the meaning and range of equivalence of the claims are therefore intended to be embraced therein.

What is claimed is:

1. A solid-state laser apparatus, comprising:
   a condenser mirror having a curved cross-sectional shape with first and second foci;
   a laser rod having a central axis arranged at the second focus of the condenser mirror; and
   at least one laser diode arranged at the first focus of the condenser mirror for irradiating light to the laser rod, light axes of the light coinciding with the direction of a long axis of the condenser mirror.

2. A solid-state laser apparatus according to claim 1, wherein the length between the first and second foci is selected so that directly incident light from the at least one laser diode on the laser rod has power that is 30–40% of the power of all the incident light from the at least one laser diode to the laser rod.

3. A solid-state laser apparatus according to claim 1, wherein an eccentricity of the condenser mirror provides axes of directly incident lights from the at least one laser diode on the laser rod and axes of incident lights from the laser diodes to the laser rod reflected from the condenser mirror to be arranged at an angle of 120 degrees relative to each other.

4. A solid-state laser apparatus according to claim 1, wherein the condenser mirror is sealed by a transparent member in an opening in the mirror, is filled with a cooling medium, and includes a passage to flow the cooling medium between the condenser mirror and the transparent member.

5. A solid-state laser apparatus according to claim 1, further comprising an optical member disposed between the at least one laser diode and the laser rod to concentrate the directly incident light on the laser rod.

6. A solid-state laser apparatus according to claim 5, wherein the optical member is part of a transparent medium in an opening in the mirror for sealing the mirror.

7. A solid-state laser apparatus according to claim 1, wherein a reflecting member for the laser rod is arranged at an area near the at least one laser diode except in a path of the incident light.

8. A solid-state laser apparatus according to clam 1, wherein the condenser mirror is made of a ceramic member and has a light reflecting rate greater than 90% in the band of the wavelength in which the laser diode oscillates.

9. A solid-state laser apparatus, comprising:
   a condenser mirror having substantially an elliptical cross-sectional shape with first and second foci;
   a laser rod having a central axis arranged at the first focus of the condenser mirror;
   at least one laser diode external to the condenser mirror for irradiating light on the laser rod through an opening in the condenser mirror, and light axis of the light arranged in the direction of the long axis of the condenser mirror;
   a diffuser disposed at the second focus of the condenser mirror to diffuse the incident lights from the at least one laser diode.

10. A solid-state laser apparatus according to claim 9, wherein the diffuser has a shape similar to a shape of the laser rod.

11. A solid-state laser apparatus according to claim 9, wherein the diffuser is made of a ceramic member and has a light reflecting rate greater than 90% in the band of the wavelength in which the at least one laser diode oscillates.

12. A solid-state laser apparatus according to claim 9, wherein the diameter of the diffusion means is not greater than the diameter of the laser rod.

13. A solid-state laser apparatus according to claim 9, wherein the condenser mirror is made of a ceramic member and has a light reflecting rate greater than 90% in the band of the wavelength in which the at least one laser diode oscillates.

14. A laser marking apparatus, comprising:
   a table to support an object for processing;
   a solid-state laser apparatus according to claim 9; and
   a scanning system to move light from the solid-state laser apparatus relative to the object.

15. A laser marking apparatus, comprising:
   a table to support an object for processing;
   a solid-state laser apparatus according to claim 1; and
   a scanning system to move light from the solid-state laser apparatus relative to the object.

* * * * *